United States Patent
Gosselin et al.

(10) Patent No.: US 6,714,339 B2
(45) Date of Patent: Mar. 30, 2004

(54) OPTICAL SWITCH BASED ON LIGHT SPATIAL MODULATORS

(75) Inventors: Stéphane Gosselin, Pleumer Bodou (FR); Philippe Gravey, Lannion (FR); Nicole Wolffer, Saint Quay Perros (FR); Alan Lelah, Grenoble (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/311,085
(22) PCT Filed: Jun. 15, 2001
(86) PCT No.: PCT/FR01/01875
§ 371 (c)(1), (2), (4) Date: Apr. 22, 2003
(87) PCT Pub. No.: WO01/96939
PCT Pub. Date: Dec. 20, 2001

(65) Prior Publication Data
US 2003/0161028 A1 Aug. 28, 2003

(30) Foreign Application Priority Data
Jun. 16, 2000 (FR) .............................. 00 07757

(51) Int. Cl.⁷ .......................... G02B 26/00; G02B 6/26
(52) U.S. Cl. .................. 359/291; 359/290; 385/16; 385/18
(58) Field of Search ................. 359/290, 291, 359/298, 39, 93, 96; 358/16, 18

(56) References Cited

U.S. PATENT DOCUMENTS

| 4,948,229 A | 8/1990 | Soref ......................... 385/16 |
| 5,477,350 A | * 12/1995 | Riza et al. ................... 349/24 |
| 5,930,012 A | 7/1999 | Mears et al. ................. 359/15 |
| 6,430,328 B1 | * 8/2002 | Culver et al. ................ 385/16 |

FOREIGN PATENT DOCUMENTS

| JP | 6-27501 | 2/1994 |
| WO | WO 99/55024 | 10/1999 |

OTHER PUBLICATIONS

Optics Communications, "Holographic switching between single mode fibres based on electrically addressed nematic liquid crystal gratings with high deflection accuracy", Wolffer, et al., 3 pages, vol. 160, (Feb. 1, 1999).

XP–000978036, "A Holographically Routed Optical Crossbar Using a Ferroelectric Liquid–Crystal over Silicon Spatial Light Modulator", O'Brien, et al., vol. 181, pp. 79–86 (Jul. 23, 1995).

Opticals Communications, "Optical switching with two FLC SLMs", Lofving, et al., North–Holland Publishing Co., 5 pages (Jan. 2000).

* cited by examiner

Primary Examiner—Georgia Epps
Assistant Examiner—Tim Thompson
(74) Attorney, Agent, or Firm—Blakely, Sokoloff, Taylor & Zafman

(57) ABSTRACT

The invention concerns an optical switch for optical beams comprising a series of optical input channels (110) and a series of optical output channels (210), two optical index spatial modulating cells (300, 400) adapted to respectively deflect an optical beam coming out of an input channel and arriving onto an output channel, each series of optical channels (110, 210) being distributed according to two dimensions transverse to the direction of the channels and the index spatial modulating cells (300, 400) being each designed to produce deflections according to said two dimensions. The invention is characterised in that it comprises at least a convergent optical assembly (500) overlapping one first of the two cells (300, 400) and whereof the focus, defined relative to the light path in the switch, is proximate to the plane of the other cell, and the or each convergent optical assembly (500) has its optical center (X) bordering a deflecting cell (300, 400), substantially perpendicular to the center on one side of said cell.

18 Claims, 5 Drawing Sheets

OPTICAL SWITCH BASED ON LIGHT SPATIAL MODULATORS

The present patent application is a non-provisional application of International Application No. PCT/FR01/01875, filed Jun. 15, 2001.

BACKGROUND OF THE INVENTION

The invention relates to a device capable of interconnecting two sets of optical fibers and primarily relates to the field of telecommunications equipment.

It may be used in the nodes of various types of optical telecommunications networks, especially in cross-connection or switching equipment in networks using wavelength division multiplexing (WDM) technology.

Optical cross-connection equipment is starting to be used experimentally in optical transport networks and will have to be deployed on a large scale in future years.

The reconfigurable optical cross-connection function makes it possible, in a node of the WDM network, to establish and reconfigure connections between the incoming optical channels and the outgoing optical channels.

It primarily meets the needs for securing the network in the event of link or node breakdowns, by virtue of the possibility of bypassing nodes by the WDM channels.

In this case, the optical cross-connects are reconfigured by network administration bodies. This possibility of reconfiguring optical cross-connects more generally makes it possible to change from a juxtaposition of point-to-point WDM links to a genuine flexible optical layer whose granularity is the wavelength (or optical channel), that is to say 2.5 or 10 Gbit/s. This need for flexibility of the optical layer is in particular linked to the increase of Internet traffic and to the need to manage the increasingly large WDM transmission capacities which result therefrom.

More generally, this invention relates to all the fields where optical beam routing is necessary.

Switching matrices for optical cross-connects have been produced using electronic technology. Several manufacturers (Tellium, Nortel, Ciena, Monterey Networks, Sycamore, Nexabit Networks) have announced products using this technology.

The all-optical cross-connection technologies are less advanced. They are transparent at the bit rate of each optical channel, and will therefore allow better upgradeability of equipment in a multiple seller and multiple bit rate environment. On the other hand, it is relatively clear that these technologies can only be imposed on the market if their cost is competitive with respect to the electronic technologies.

Among the all-optical technologies available, solutions called optomechanical solutions have good maturity and excellent optical performance (DICON, JDS, AMP, etc.). Nevertheless, they are characterized by a large overall size and a price which quickly becomes prohibitive depending on the number of ports.

Integrated thermooptical matrices are also available, either made using polymer technology (JDS), or silica technology (NEL). Obtaining a number of ports greater than 16 remains a problem.

Other integrated technologies, such as lithium niobate or indium phosphide still require significant developments in order to arrive at high-performance and high-capacity matrices.

The above technologies suffer from a lack of integration (in the case of N×N systems, with N inputs and N outputs, based on the use of 2N discrete deflectors 1×N) or require a high number of elementary components limiting the possibilities of integration counting from N=16 or 32 (case of planar integrated matrices).

Also, the research effort is oriented toward solutions capable of offering, a few years hence, high capacities at a realistic cost, based on technologies having already acquired a certain maturity away from the field of conventional optoelectronics.

Microelectromechanical systems (MEMS) on silicon are being studied for optical cross-connection applications, mainly in the USA (AT&T, IMMI, OMM, Astarte, Lucent, Xros, etc.).

These systems use switching matrices based on micromirrors on silicon capable of deflecting an optical beam along two axes. An optical cross-connect having 576 ports has been produced by Texas Instruments and Astarte. On its part, Lucent announces the marketing at the end of 2000 of a 'Wavestar lambda router', having 256 ports. For its part, Xros presents a prototype having 1152 ports, with provision for marketing at the start of 2001.

The use of micromirrors is especially beneficial from the point of view of wavelength insensitivity and polarization independence.

However, this emerging technology still raises questions with regard to reliability, angular control and manufacturing efficiency, in the case of matrices having several tens of micromirrors, each one having a diameter of a few hundred $\mu$m.

Liquid crystal technologies, which have a good level of maturity for display applications, also provide interesting perspectives. NTT and France Télécom have produced various demonstrations, by cascading several stages of liquid crystal cells and of birefringent calcite crystals (for example 11 stages for 64 ports).

Smaller-capacity devices, also using the rotation of polarization in a liquid crystal, are proposed in Japan by NEL, and in the USA by Chorum and Spectraswitch.

The use of diffraction gratings created in high-resolution liquid crystal cells has also been envisioned for several years (NTT, University of Cambridge, ENST Bretagne, France Télécom). In order for two sets of monomode fibers to be interconnected efficiently, it is necessary to cascade two deflection stages. This approach has been used in a 16×16 demonstrator based on two linear arrays of holographic gratings recorded on a photosensitive support [6] and also in an 8×8 system using two linear arrays of liquid crystal deflectors.

In addition, the general use of diffraction gratings based on electrically addressed liquid crystals has been proposed by various laboratories, in diverse applications.

In these devices, an electrical voltage applied locally to the terminals of a liquid crystal of suitable type makes it possible to create a local variation in refractive index or birefringence.

By making this value vary along one or two axes it is possible to create a structure which will diffract an incident beam in one or more preferred directions, depending on the spatial profile of the index variation: thus a beam deflector functionality is obtained.

To date, work in the field of optical routers is limited to devices in which the beams undergo a single deflection (cf. work by NTT [1], of the University of Cambridge [2, 3], and by ENST Bretagne [4]). This approach is suitable for matrices of 1×N type with 1 input and N outputs [1, 3, 4] or possibly for N×N matrices of low capacity [2]. This is because, in this last case, a loss factor 1/N has to be introduced with monomode fibers. The capacities demonstrated experimentally with this approach remain modest: 1×8 [5] and 1×14.

The liquid crystal devices proposed only allow a small number of fibers to be connected.

Liquid crystal router devices deflecting the optical beams in two perpendicular dimensions have also been proposed. However, the proposed devices prove to be bulky since the deflection means have to be powerful.

SUMMARY OF THE INVENTION

The invention mainly proposes to solve this drawback, that is to say to provide an optical router in two dimensions in which the deflection means are less bulky, while minimizing the optical losses and while adopting a spatial frequency band of reasonable spread.

The invention proposes to solve this drawback by virtue of an optical beam routers comprising a series of optical input channels and a series of optical output channels, two optical spatial index modulation cells capable of deflecting an optical beam coming out of an input channel and arriving onto an output channel, respectively, characterized in that each series of optical channels is distributed in two dimensions transverse to the direction of the channels and in that the spatial index modulation cells are each provided in order to produce deflections in these two dimensions.

BRIEF DESCRIPTION OF THE DRAWINGS

Other characteristics, aims and advantages of the invention will become apparent on reading the following detailed description, made with reference to the appended figures in which.

DETAILED DESCRIPTION OF THE PREFERRED EMBODIMENT

Figure 1:
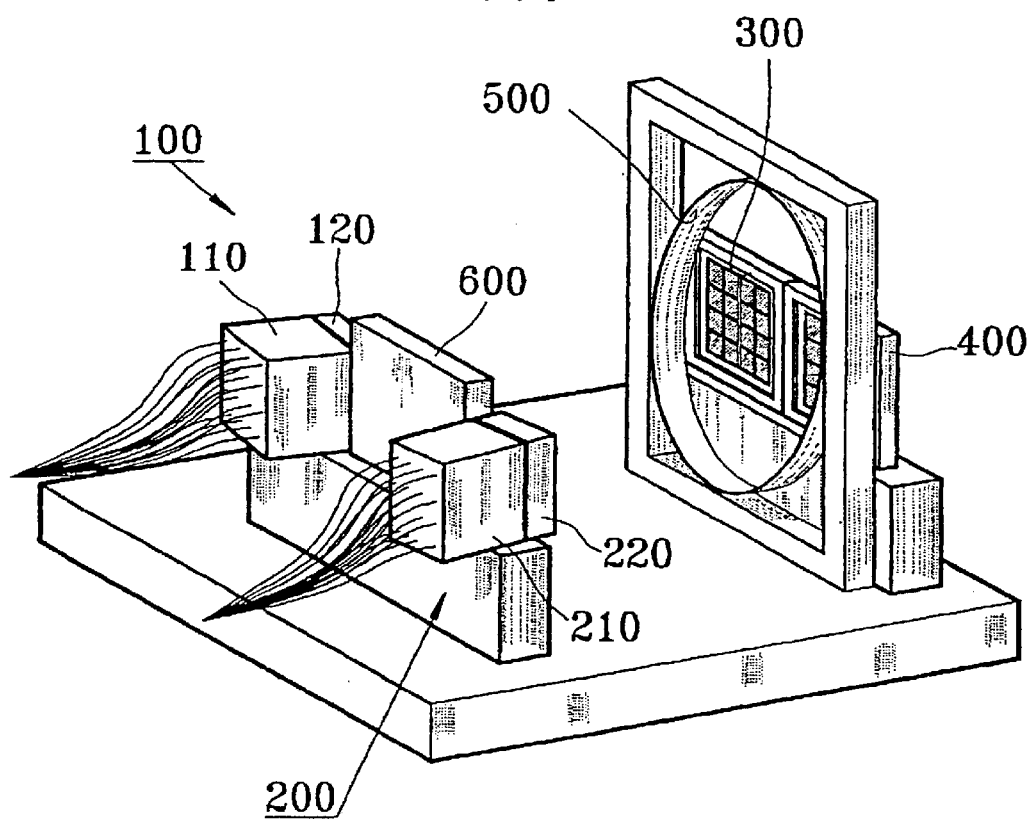
FIG. 1 is a perspective view of a router according to the invention.

The interconnection device of FIG. 1 has input/output modules 100 and 200, each one consisting of an optical fiber matrix 110, 210 associated with a microlens matrix 120, 220 whose function is to collimate the beams coming from the optical fibers over a distance needed for the operation of the system.

The inputs and the outputs are therefore organized into two-dimensional matrices of beams collimated by means of microlenses.

In addition, it shows spatial light modulating components 300 and 400, in this case having liquid crystals, with which it is possible to create localized index variations, so as to diffract the collimated beams in variable directions.

A first deflection implemented by the device 300 makes it possible to direct the incident beam toward the direction(s) corresponding to the desired output fiber(s). The second deflection (cell 400) enables the axis of the beam and that of the output fiber to be made parallel.

This second deflection is essential to ensure efficient coupling in the latter, especially in the (usual) case where monomode optical fibers are used.

These spatial light modulators (or deflection "cells") 300 and 400 operate in reflection mode and are located in the same plane. They are divided into "subcells", each one dedicated to an input or output fiber. Thus, only a silicon substrate is used in order to control the inlet deflectors and the outlet deflectors, making it easy to position and align the system.

The device of FIG. 1 also has a lens 500 (several in one variant), in this case called a macrolens, as opposed to collimation microlenses, one of the roles of which is to prevent light directly reflected by the spatial light modulators disturbing the output channels and to ensure that the same band of spatial frequencies is used on the set of subcells of the spatial light modulators, which makes it possible to limit the passband (of spatial frequencies) of these components.

Such a device makes it possible to limit the spatial frequency band needed for a given number of inputs/outputs, and also to significantly improve the optical isolation between the unconnected inputs/outputs (decrease of optical crosstalk).

The careful positioning of the macrolenses makes it possible to minimize, for a given system capacity, the band of spatial frequencies required for the spatial light modulators, and consequently, to minimize the optical losses of the system and/or to improve its compactness.

Thus, by positioning the convergence point of one of the macrolenses in the vicinity of the center of the border of the opposite cell, the distance between the convergence point and the cell furthest away from this convergence point corresponds to the diagonal of half the opposite cell. This diagonal is shorter than the diagonal of the complete cell, such that the maximum deflection to be applied to a beam is smaller than in a device where the convergence point would have been placed in a corner of this opposite cell. Since the maximum deflection to be applied is small, the deflection means only require a reasonable power, and are therefore less bulky, which makes it possible to improve the compactness of the assembly.

The present router comprises an intermediate optic, in this case a mirror 600, making it possible to direct the beam, after deflection by the first spatial light modulator 300, toward the second spatial modulator 200.

Additional optics (not shown in FIG. 1) are inserted between the matrices of micro- and macrolenses in order to split the two polarization components conveyed by the optical fibers, especially where standard monomode fibers and spatial light modulators are used, the characteristics of which depend on the polarization (set-up with polarization diversity).

The choice of the position of the axes of the macrolens(es) 500 and the spatial organization of the spatial light modulators, in particular in the case of a set-up with polarization diversity, is presented in detail below.

Spatial light modulators operating in reflection mode are used: this approach makes it possible to use high-resolution components made on a nontransparent substrate (firstly, liquid-crystal spatial light modulators addressed by VLSI, or other technologies based on electrooptical phase modulators added on to VLSI).

Often, these spatial modulators are polarization sensitive: this is the case for nematic liquid crystal modulators which only operate in the presence of a particular rectilinear polarization.

Other components may have a residual polarization sensitivity, due, for example, to manufacturing imperfections.

To alleviate this drawback, working in normal incidence mode is avoided, as is the case for example with a set-up based on polarizing cubes and on quarter-wave plates.

The deflection cells and the macrolenses are inclined so as to angularly split the beams from the normal to the deflection cells. This solution may of course be used, even when the components have good polarization insensitivity (as for example with ferroelectric liquid crystals).

Figure 2A:
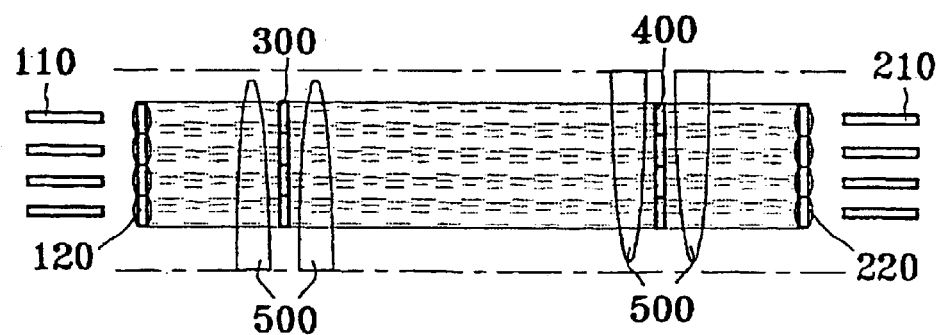
FIG. 2a is a view in longitudinal section of a router in transmission mode and at normal incidence.
Figure 2B:
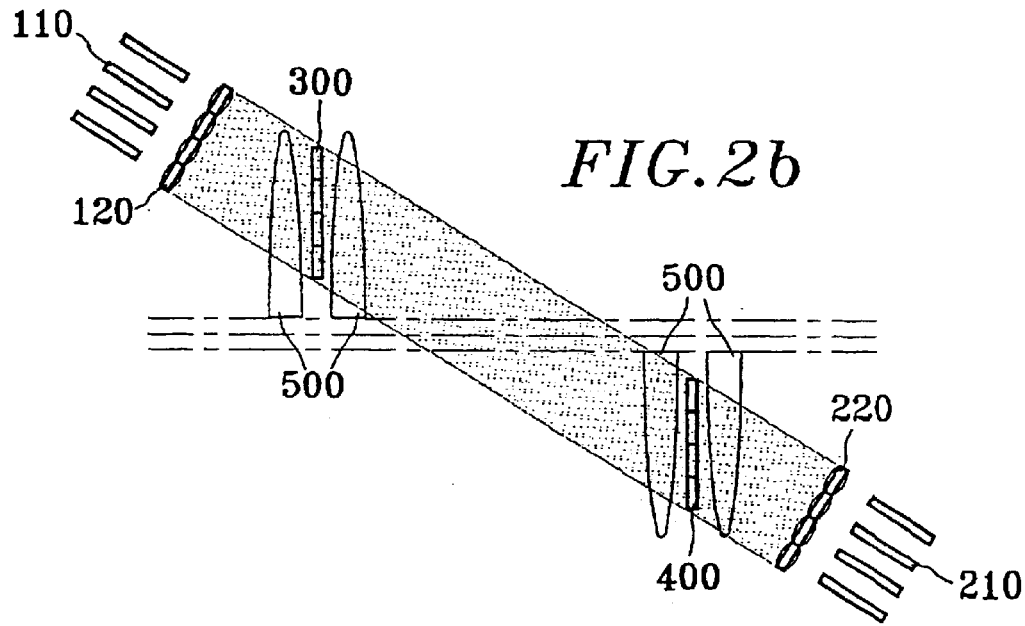
FIG. 2b is a view in longitudinal section of a router in transmission mode and at inclined incidence.
Figure 2C:
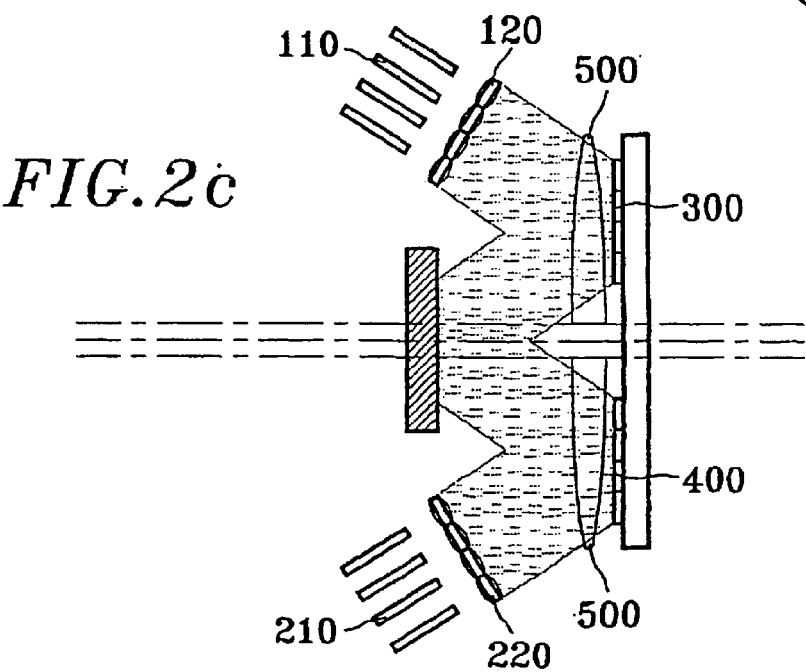
FIG. 2c is a view in longitudinal section of a router in reflection mode with an intermediate mirror.

FIGS. 2a to 2c illustrate the change from a set-up in transmission mode and at normal incidence (FIG. 2a) to a set-up in inclined transmission mode and at inclined incidence (FIG. 2b), then a set-up in reflection mode with an intermediate mirror (FIG. 2c).

Note that, in the device of FIG. 1, the beams incident on the cells in reflection mode pass twice through the macrolens 500, and the set-ups in transmission mode (that is to say without reflection) are therefore shown with a macrolens on each side of the deflection cells.

This architecture is relatively compact. Furthermore, it allows the overall alignment of the system using beams reflected directly by the cells (zero orders) before even placing the macrolenses.

Furthermore, it is useful that the input deflection cell 300 is in the same plane as the output cell 400: this simplifies the final set-up of the system, and makes it possible to benefit from high accuracy of relative positioning of the deflection cells (in particular when the modulator is made from a VLSI circuit). To do this, it is proposed to use an intermediate reflection mirror 600 between inputs and outputs. The case of a plane mirror 600 will be considered hereinbelow, but other types of mirror can be used.

In the present embodiment, the device has no moveable part.

To produce a system referred to as "having polarization diversity", the beam coming from a microlens 500 is split into its two polarizing beam components using a calcite plate (or a polarizing beam splitter cube according to one variant), then the polarization component orthogonal to the rubbing direction of the liquid crystal is rotated by 90° using a half-wave plate.

Thus, in this device, two birefringent crystal plates associated with half-wave plates (or a liquid crystal cell) and placed respectively at the input and at the output of the system allow the latter to be made insensitive to the light polarization, even if the spatial light modulators are sensitive to the light polarization (local polarization diversity).

Each of these two components, one of which is reoriented, forms a sub-beam which is then individually and independently treated, that is to say that each deflection cell has distinct zones each one of which deflects a respective polarization of the same beam (polarizations momentarily restored parallel to one another after splitting).

At the output of the switching system, the reverse process (half-wave plate+calcite or cube) makes it possible to differentiate the orientations again and to recombine the two polarization components. Note that the lengths of the optical paths followed by these two polarization components have to be very close (to within 0.3 mm, for a polarization mode dispersion (PMD) of 1 ps).

This set-up with double polarization diversity uses the necessary capacity thereof. Two options are now envisioned, with reference to FIGS. 3 and 4.

Figure 3:
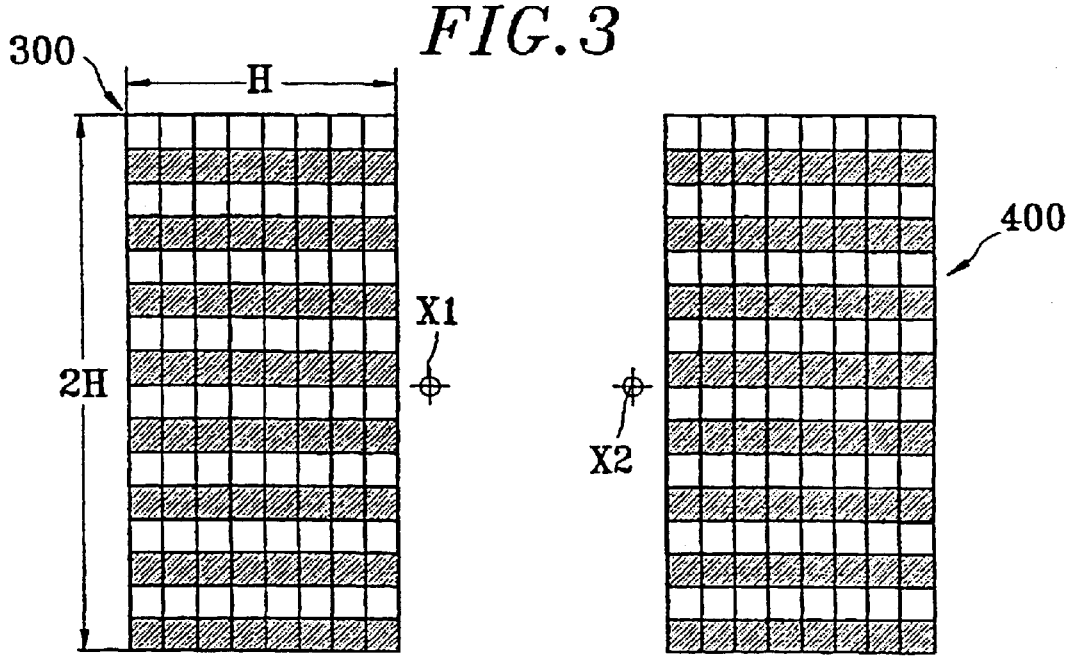
FIG. 3 is a front view of a set of two deflection cells each one comprising two parts, each one intended to deflect one or other sub-beam, respectively, coming on each occasion from splitting of an input beam, these two parts constituting on each occasion a series of rays belonging alternately to a first and to a second part.

In FIG. 3, the deflection cells 300 include rectangular active zones, comprising an interlacing of the rows of subcells, the term subcell referring to part of a cell which deflects a single beam. Thus, a row of subcells belongs alternately to the part intended to deflect the reoriented sub-beams, and alternately to the part intended to deflect the other sub-beams, which in this case are not reoriented.

Thus, for a system of capacity N×N (N inputs and N outputs), and by referring to M as the square root of N, the input deflection cell 300 consists of 2M rows of M subcells (2M×M).

The even rows are used for deflecting sub-beams coming from horizontal polarization components and the odd rows for deflecting sub-beams coming from vertical components (other arrangements are also possible).

In this option, the polarizing beam splitter element is preferably a calcite plate placed against the microlens matrix 120. Its thickness must allow an offset between polarization components corresponding to the center-to-center spacing of the subcells of two consecutive rows.

The polarization is then rotated by N half-wave plates located facing even rows of subcells. These plates may be adhesively bonded to the calcite plate. This function may also be provided by a liquid crystal cell of the twisted nematic type in transmission mode, the pixels of which are strips located facing even rows.

Note that this set-up requires matrices of fibers and of microlenses of rectangular shape, where the vertical pitch is twice the horizontal pitch, itself equal to the pitch of the subcells.

According to one variant, the two split sub-beams, coming from the two polarization components, are treated separately by two deflection portions forming different areas in each cell 300 and 400.

Figure 4:
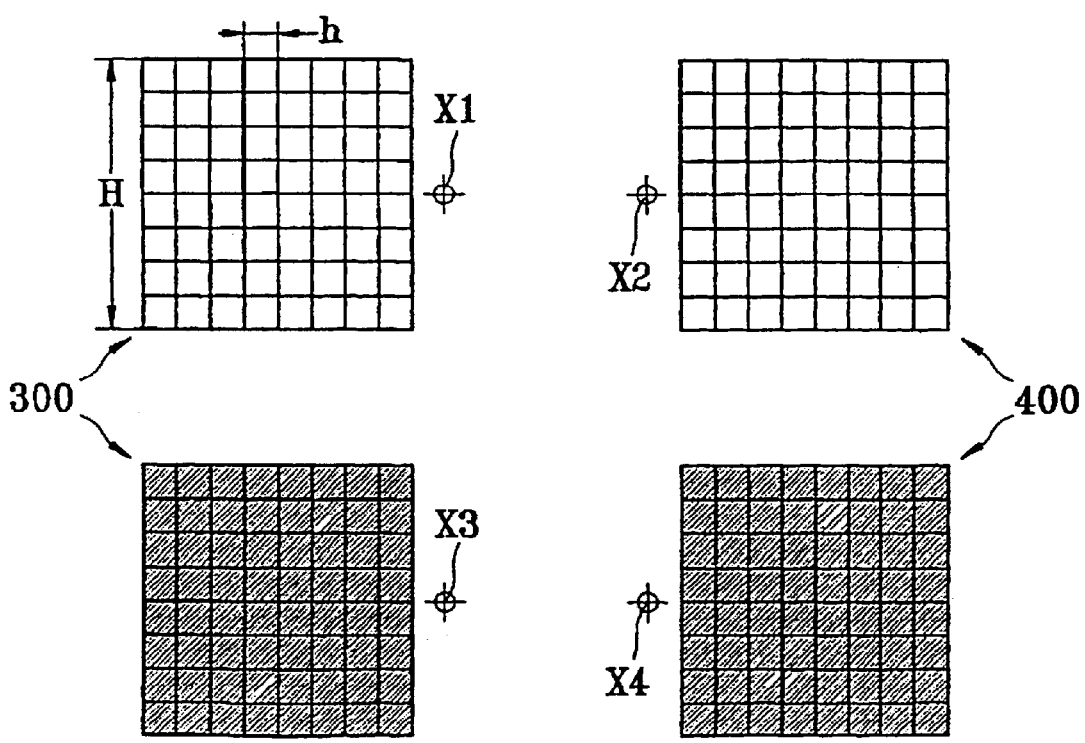
FIG. 4 is a front view of a set of two deflection cells each one comprising two parts, each one intended to deflect one or other sub-beam, respectively, coming on each occasion from splitting an input beam, these two parts constituting, on each occasion, noninterlaced surfaces.

In the example of FIG. 4, these portions have a square active zone (M×M subcells), that is a total of four square deflection portions for both cells 300 and 400 brought together (2 for the input, 2 for the output).

This amounts to producing, within each cell 300 or 400, on each occasion, two independent switching systems, one for each polarization component.

In this option, the matrices of fibers 110, 210, and of microlenses 120, 220, are regular square matrices, whose pitch is substantially equal to that of the subcells.

The polarizing beam splitter element is preferably a splitter cube, placed against the matrix of microlenses 120, 220, and a half-wave plate is placed against one of the output faces of the cube.

Thus, in this variant, two assemblies, each one consisting of a polarizing beam splitter cube, of a half-wave plate, and of another splitter cube, are placed respectively at the input and at the output of the system, and make it possible, in combination with four active deflection zones, to make the system insensitive to the light polarization, even if the spatial light modulators are sensitive to the polarization (overall polarization diversity).

In the two examples of FIGS. 3 and 4, the active deflection zones are implanted on a VLSI. In these figures, a single VLSI circuit therefore encompasses the active deflection zones and enables them to be controlled simultaneously.

In FIGS. 3 and 4, the hatched zones correspond, for example, to the subcells which treat the horizontal polarization component, while the white zones are reserved for the other polarization component.

The positions of the macrolens axes are shown in FIGS. 3 and 4, referenced X1 and X2 in FIG. 3 and X1, X2, X3, X4 in FIG. 4.

In the variant of FIG. 4, four macrolenses are used, each macrolens being associated with an active deflection zone, and enabling the capacity to be increased, the optical losses to be decreased and/or the compactness of the system to be improved.

Note that in the case of overall polarization diversity (FIG. 4), it is also possible to use only two macro-lenses instead of four, with axes positioned in a similar manner to the set-up with local polarization diversity (FIG. 3), but the spatial light modulators must then have a high spatial resolution.

When a lens 500 is positioned such that, apart from any deflection by the cells 300 and 400, a position at the output $(x_s, y_s)$ (in the reference frame of the lens, with respect to its X axis) with $1^{st}$-order interference is aimed for, the position of the $m^{th}$ diffraction order is given by $(mx_s, my_s)$.

It has to be ensured, in the dimensioning of the system, that a priori the positions of the more problematic interference orders (typically orders −3, −2, −1, 0, 2 and 3) fall outside the field of the output cell, or between two neighboring output ports.

Thus, the axes of lenses and their foci will be placed outside opposing cells of active zones, that is to say outside the zone of path of the beams located between the two cells 300 and 400, so that the zero order and the negative orders do not arrive on the cells, and are also not problematic for any of the active deflection zones.

More specifically, the axis of the lens (FIG. 5) will be placed so that the positions of the centers of subcells are given, in the reference frame of the lens, by:

$$\begin{cases} x_s = (1.25 + i) \cdot h \\ y_s = (0.5 + j) \cdot h \end{cases} \text{With} \begin{cases} i \text{ positive or zero integer} \\ j \text{ positive, negative or zero integer} \\ \text{corresponding to a subcell } (i, j) \end{cases}$$

where h is the center-to-center spacing of the subcells (equal to that of the fibers, to within the parallax effect).

With this arrangement, only the 5th diffraction order may be problematic, since, when an output port located close to the lens axis is aimed for, this 5th order may fall exactly on a third output port.

The other potentially problematic positive orders (in particular, 2nd and 3rd orders) may be more intense than the 5th order, but will be reinjected slantwise into the output fibers, therefore more attenuated than the 5th order.

Compared with a configuration where the positions of the macrolens axes are not optimized, the gain in optical isolation for the complete system is estimated at more than 20 dB.

Figure 5:
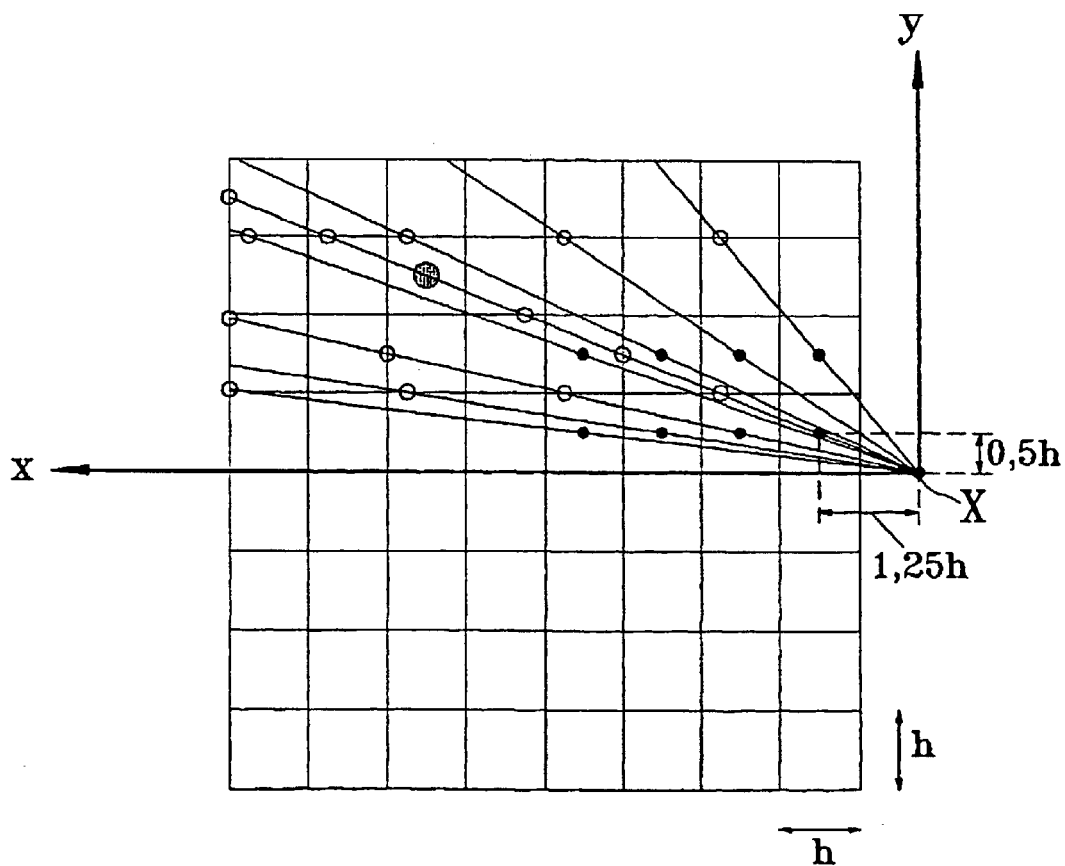
FIG. 5 shows, in a device according to the invention, a reference frame centered on an optical axis of a macrolens, and the position in this reference frame of diffraction points having different orders arriving on an output cell, after deflection by diffraction produced by an input cell.

More specifically, with reference to FIG. 5, in the paraxial approximation, the pitch of the diffraction grating, oriented perpendicular to the deflection direction, is inversely proportional to the length of the vector linking the projection of the origin O from the axis of the macrolens in the output plane to the center of the zone to be reached (zone of the cell 400 corresponding to the desired output channel).

FIG. 5 shows the lines connecting O to the center of the zone in question, for the zones located closest to the X axis.

When $1^{st}$-order diffraction is used for optical communication (usual case for reasons of improved efficiency of the gratings), the pitch of the diffraction grating is chosen such that the 1st order has its center coincident with the center of the zone (solid circles in the figure).

The position of the higher orders (of order M>1) is also shown: the latter are in the extension of the vector connecting O to the center of the zone to be reached, the distance from their center to O being equal to M times the distance from O to the center of the 1st order.

In FIG. 5, they are shown by empty circles, in the most frequent case where their position is offset with respect to the center of the closest zone, which limits the quantity of parasitic light injected into the corresponding output fiber.

The hatched circle corresponds to the case where a higher order (in this case, 5th order) sees its center coinciding with that of one of the output zones. However, since this order is high, only a very small proportion of light is diffracted in its direction, which also limits the amount of parasitic light.

This situation arises from a careful choice of the position of the lens center: it is necessary that the center is close to the middle of one of the sides of the square (or of the rectangle in the case of local polarization diversity) consisting of all the output zones, so that the minimum grating pitch is not too small (which would be the case if a large angular deflection was needed, due to the placement of the center of the lens in an offset zone of the device).

It is also preferably necessary that the center of the lens is away from the center of the closest deflection zone, by a distance at least equal to the width h of a zone, so as to limit the disturbance given by zero grating orders.

In the case of FIG. 5, O is offset along y by a half-zone height from the center of the closest subcell, and the following offset x corresponds to ¾ of the zone width this time from the side of the closest zone (that is to say at 1.25 times this distance from the center of the closest zone).

The positions of the zone centers are therefore, in the coordinate system of the macrolens (here in the case of a system with 64 ports having overall polarization diversity):

$x_s = (1.25+i)h$ where $0 \leq i \leq 7$ $y_s = (0.5+j)h$ where $-4 \leq j \leq 3$ This means that a beam of higher order, centered at $(mx_s, my_s)$, is centered on an output zone if and only if these coordinates have the form $((1.25+i)h, (0.5+j)h)$.

The only cases where this occurs are when the 1st order corresponds to the values i=j=0 and m=5 (specifically, 5×1.25=6.25 and 5×0.5=2.5) and, from the symmetry with respect to Ox, i=0, j=−1.

Other offsets of the form $x_s=(1+\delta_x+i)$ h, $y_s=(\delta_y+j)$ h where $\delta_x$ and $\delta_y$ are not integers, can be used.

However, in the case of 8×8 zones, the previous choice is a good compromise.

For example, if $y_s$ is left unchanged, and if $\delta_x=0.20$ is chosen, there will be coincidence of position only with a 6th order (6×1.20=7.20), but the offset of the lower orders is overall less important. With $\delta_x=0.30$, coincidence of position of position is never obtained, but the 3rd order of which is only offset by 10% along x.

If, moreover, the position of the lens is moved away from the Ox axis (y≠0.5) for symmetry reasons, it appears that if the effect of the higher orders is decreased on one of the halves of the output matrix, it will be increased on the other half. Finally, the optimum choice will depend on the relative weight of the diffraction orders and on the number of zones.

More generally, the transmission of undesirable orders is prevented by placing the macrolens such that its optical axis is at a distance from the center of the closest zone, measured parallel to one or other of the x or y directions, which is not a multiple of the distance between two successive zones, also measured along this same x or y direction.

This arrangement is even more advantageous when it is verified both with respect to the x axis and with respect to the y axis.

Furthermore, this optimized positioning of the macrolens axes makes it possible to minimize the band of spatial frequencies required for the spatial light modulators. This minimization of the band of spatial frequencies makes it possible to increase the capacity of the system, to improve its compactness, to decrease the optical losses or else to combine several of these three possibilities.

In the scenario described above, the interconnection system will comprise two or four deflection parts each one treating 2M×M or M×M beams: two cells of square active zones (components insensitive to the polarization); two cells of rectangular active zones (local polarization diversity); four cells of square active zones (overall polarization diversity).

It is generally advantageous to combine all these active zones within a single spatial light modulator: for example, in the case of a liquid crystal spatial light modulator, this approach means having to manufacture only one liquid crystal cell per interconnection system.

When the active zones are equipped with a VLSI circuit (integrated circuit on silicon with high integration), it is also advantageous that this circuit encompasses a maximum of active zones, given the technological limitations (dimension of the photomasking reticule, surface area of an active zone and of its peripheral electronics, number and pitch of the contact pads, size of the adhesive seal needed to seal the liquid crystal cell, etc.).

In the short term, for a 64×64 capacity, it appears, according to the results presented in the following section, conceivable to integrate at the most two square active zones per VLSI circuit). According to one variant, all the active zones are integrated within a single VLSI circuit. In all cases, it is possible to integrate all the active zones of the system (2 or 4) onto a single silicon substrate, it being possible for this substrate optionally to comprise several VLSI circuits. This integration of two deflecting cells 300 and 400 on a single substrate makes it possible to control the relative positioning of these active deflection zones very accurately and facilitates the alignment of the optical beams.

In the optical routing systems calling on reconfigurable diffractive components (such as for example the liquid crystal spatial light modulators), the optical power losses associated with the deflection of each optical beam depend on the value of the angle of deflection.

This dependence results in a variation of the total optical losses of the routing system as a function of the inputs/outputs connected.

As explained below, the proposed system makes it possible, by virtue of the presence of a macrolens in front of each cell 300 and 400 to obtain uniform losses over all the possible connections between the inputs and the outputs of the system, and this without resorting to any optical power control system.

It is noted firstly that the loss variations of the system as a function of the connections are linked to those of the input modules (fibers+microlenses+optional polarization treatment components), of the two deflection stages, and of the output modules.

Figure 6:
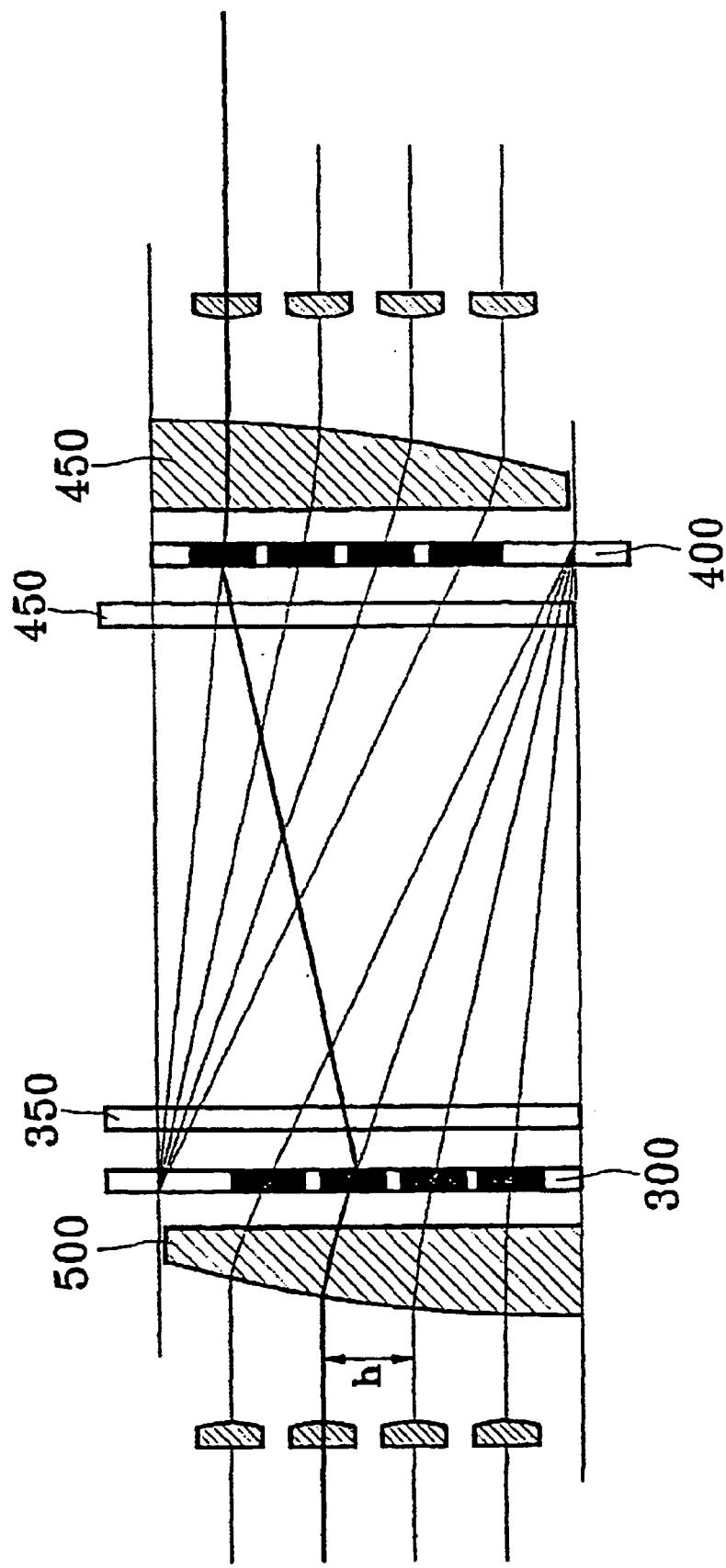
FIG. 6 is a simplified view in longitudinal section of a router according to the invention, the optical beams of which have been added in the plane of the figure and the optical elements of which have been added along the path of the beams.

FIG. 6 shows the effect of the macrolenses on the geometric distribution of the beams. In this figure, exploded along the optical path and corresponding to the set-up of FIG. 1 (this figure could also represent a variant without deflection), the lens 500 of FIG. 1 has been divided into two to illustrate the fact that, in FIG. 1, each beam passes twice through the lens 500.

For a given connection of the input i to the output j, and in the paraxial approximation, the deflection angle at the input only depends, due to the presence of a convergent macrolens in front of the input cell 300 (or any other type of convergent set-up, such as a series of lenses on the same optical path, for example), on the output (not the input in question). This is because, since all the zero orders are, whatever the input in question, focused on the axis of the input macrolens, the same deflection is necessary, whatever the input in question, so that the 1st order is deflected over a given output.

It is therefore possible to correct the input deflection losses by means of an attenuator with fixed attenuation distribution in front of the output cell 400, referenced 450 in FIG. 6.

Similarly, the deflection angle at the output only depends, due to the presence of a convergent macrolens in front of the output cell 400 (or any other type of set-up substantially converging on the input cell, such as a series of lenses on the same optical path, for example), on the input (pitch of the output in question). It is therefore possible to correct the output deflection losses by an attenuator with fixed attenuation distribution in front of the input cell 300, referenced 350 in FIG. 6.

This beneficial property of the system, linked to the use of macrolenses, enables the system losses (in dB) to be written in the following form:

$$p(i, j) = p_e(i) + p_1(j) + p_2(i) + p_s(j) \quad \text{with} \begin{cases} p_e(I) \text{ input losses, dependent on the input } i \\ p_1(j) \text{ input deflection losses} \\ p_2(I) \text{ output deflection losses} \\ p_s(j) \text{ output losses, dependent on the output} \end{cases}$$

It is therefore possible to make the losses of the routing system uniform, independently of the inter-connection configuration thereof, by placing attenuators on all the inputs and all the outputs of the switch. These attenuators are, according to one variant, nonprogrammable attenuators, having an even lower cost.

The present device uses attenuators which can be adjusted on the inputs and the outputs, the preadjustment of the attenuators making it possible to obtain uniform optical losses over all the possible connections between the inputs and the outputs of the system, and independent of the configuration of these connections. The attenuators are therefore of fixed attenuation.

The input [or output] attenuators must be preadjusted to loss values of type Cste−$p_e(i)$−$p_2(i)$ [or Cste'−$p_1(j)$−$p_s(j)$].

This preadjustment of the attenuators, carried out once during the system alignment phase, enables the system losses to be made independent of the connections in question or of the system configuration.

When several lenses, each one associated with different cells, are used, the optical centers of these lenses are advantageously placed on opposite sides of the light path, such that the effects of the lenses compensate for each other and that the deflections to be implemented by the deflecting cells are not too high.

Another important element is that the overall longitudinal size of the system varies quadratically with the pitch of the pixels p: high-resolution VLSI technology therefore makes it possible to design high-capacity compact switching systems.

The dimensioning of a 64×64 capacity system based on nematic liquid crystal spatial light modulators on VLSI has been described. For this dimensioning, spatial light modulators have been used with a pixel size of about 10 to 13 μm.

These values correspond to those used in the prior art of liquid crystal on VLSI technologies used for display microscreens [9].

In the present case, the liquid crystal cell is integrated onto a VLSI addressing circuit, that is to say that its main elements are affixed successively and irreversibly onto this circuit, these steps corresponding to integration.

0.18 μm VLSI technology was used. Moreover, the collimation of Gaussian beams coming from monomode fibers and especially the truncating effects associated with the finite size of the collimation optics and of the deflection subcells (in practice, the truncation factor, equal to the ratio of the useful diameter to the mode diameter must remain close to 1.5) was considered.

The following table summarizes the main parameters characterizing the geometry retained for the system. It has two variants: the first (left-hand column) combines two active zones within the same photomasking reticule; in the second (right-hand column), each active zone occupies a reticule.

This table also gives the dimensions of the active zones, which are slightly smaller than the fiber matrices (parallax), and their relative implantation (edge-to-edge separation along x and y). The dimensions of the reticule are calculated by taking account of the margins necessary for the adhesive seals and the contact pads.

The area occupied by the adhesive seals is significant compared with the useful area of the circuit.

| Number of bits | | 5 or 6 | 5 or 6 |
| --- | --- | --- | --- |
| Fiber spacing | (mm) | 1.00 | 1.00 |
| Number of pixels per side of fiber | | 96 | 96 |
| Total number of pixels per active zone along x | | 768 | 768 |
| Total number of pixels per active zone along y | | 1 728 | 768 |
| Pitch of outlined pixels | (μm) | 10.2 | 10.2 |
| Width of active zone along x | (mm) | 7.8 | 7.8 |
| Spacing x of active zones | (mm) | 23.4 | 22.2 |
| Total height y of active zones | (mm) | 17.6 | 7.8 |
| Spacing y of active zones | (mm) | 1.96 | 8.3 |
| Separation x of lens axes | (mm) | 21.9 | 20.8 |
| Separation y of lens axes | (mm) | 9.79 | 16.1 |
| Width x of fiber matrix | (mm) | 8.00 | 8.00 |
| Width y of fiber matrix | (mm) | 8.00 | 8.00 |
| Maximum deflection angle | (°) | 2.1 | 2.1 |
| Deflection distance used | (mm) | 250 | 250 |
| Mirror/cell distance | (mm) | 125 | 125 |
| Focal length of lenses | (mm) | 500 | 500 |
| Reflection angle | (°) | 7.2 | 6.9 |
| Microlens/cell distance | (mm) | 40 | 41 |

-continued

| Number of bits | | 5 or 6 | 5 or 6 |
| --- | --- | --- | --- |
| Beam radius on microlenses and cells | (μm) | 352 | 352 |
| Truncation factor | | 1.42 | 1.4 |
| Parallax factor | | 0.980 | 0.980 |
| Pitch of effective pixels | (μm) | 10.4 | 10.4 |
| (Linear) pixel fill factor | (%) | 93.7 | 93.7 |
| Phase ramp fill factor | (%) | 93 | 93 |
| Optical efficiency for deflection | (%) | 55 | 55 |
| System losses (deflections only) | (dB) | 5.2 | 5.2 |

By virtue of this device, it is possible to show, on the basis of general considerations concerning the propagation of optical beams in free space, that all the dimensions of the switching system are substantially proportional to the number of inputs/outputs of the system.

1. H. Yamazaki, M. Yamaguchi, and K. Hirabayashi, "Estimation of the possible scale of holographic switches with liquid-crystal displays", Appl. Opt., 34, 1333–1340 (1995)
2. D. C. O'Brien, R. J. Mears, T. D. Wilkinson, and W. A. Crossland, "Dynamic holographic interconnects that use FLC SLMs", Appl. Opt., 33, 2795 (1994)
3. D. C. O'Brien, W. A. Crossland, and R. J. Mears, "A holographically routed optical crossbar: theory and simulation", Opt. Comp. and Process., 1, 233–243 (1991)
4. P. Berthelé, B. Fracasso and J. -L. de Bougrenet de la Tocnaye, "Single-mode fibre optical switch using a polarisation insensitive liquid crystal spatial light modulator", Applied Optics, Vol. 37, pp. 5461–5468 (1998)
5. W. A. Crossland et al., "Beam steering optical switches using LCOS: the 'ROSES' demonstrator", IEE seminar on "Microdisplay and smart pixel technologies", 1–7, London, March 2000
6. L. Bonnel and P. Gravey, "Holographic switching between single mode fibres: evaluation of a 16×16 demonstrator and perspectives", Proc. Photonics in Switching '96, PThD4
7. N. Wolffer, B. Vinouze and P. Gravey, "Holographic switching between single mode fibres based on electrically addressed nematic liquid crystal gratings with high deflection accuracy", Opt. Commun., 160, 42 (1999)
8. D. T. Neilson et al., "Fully provisioned 112×112 micromechanical optical crossconnect with 35.8 Tb/s demonstrated capacity", in Proc. OFC 2000 (Baltimore), PD12
9. H. L. Ong, SPIE Vol. 3560 "Display devices and microsystems", pp. 1–12 (1998)

What is claimed is:

1. An optical beam router comprising a series of optical input channels and a series of optical output channels, two optical index spatial modulation cells capable of respectively deflecting an optical beam coming out of an input channel and arriving onto an output channel, each series of optical channels being distributed over two dimensions transverse to the direction of the channels and each of the index spatial modulation cells being provided to produce deflections in these two dimensions, characterized in that it includes at least one convergent optical assembly placed overlapping a first of the two cells and whose focus, defined with respect to the light path in the router, is in the vicinity of the plane of the other cell, and in that the or each convergent optical assembly has its optical center on the border of a deflection cell, substantially directly above the center of one side of this cell.

2. The router as claimed in claim 1, characterized in that a cell has a series of columns and rows, each one formed by a set of zones, each one dedicated to deflecting a single beam, and in that the or each convergent optical assembly has an optical axis placed such that the distance of this optical axis to said zone closest to this axis, a distance measured parallel to the direction of the columns or the rows, is not a multiple of the distance between two successive zones of this cell, a distance also measured parallel to the direction of the columns or of the rows, respectively.

3. The router as claimed in claim 1 or claim 2, characterized in that a cell has a series of columns and of rows each one formed by a set of zones, each one dedicated to deflecting a single beam, and in that the minimum distance between the optical axis of the convergent optical assembly and the center of a said zone in the vicinity of this axis, a distance measured parallel to the rows, is 1.25 times the distance between two successive zones, possibly increased by a whole number multiple of the distance between two successive zones, and in that the minimum distance between the optical axis and the center of a neighboring zone, measured parallel to the columns, is equal to 0.5 times the distance between two successive zones possibly increased by a whole number multiple of the distance between two successive zones.

4. The router as claimed in claim 1, characterized in that the router further includes means producing a series of different optical attenuations applied to the various channels adjacent to said other cell, each attenuation applied to a channel in question not being dependent on the channel which is momentarily optically associated with this said channel in question.

5. The router as claimed in claim 1 characterized in that said other cell is also fitted with a convergent optical assembly having its focus in the vicinity of the first cell and in that said first cell is fitted with means producing a series of different optical attenuations applied to the various channels adjacent to this first cell, each attenuation of a channel in question not being dependent on the channel which is momentarily associated optically with said channel in question.

6. The router as claimed in claim 4, characterized in that the or each attenuation distribution adjacent to a cell is substantially the inverse of a distribution of the optical losses due to the deflections in the opposite cell.

7. The router as claimed in claim 1 characterized in that at least one of the cells having spatial index modulation is a cell provided in order to reflect the beams.

8. The router as claimed in claim 7, characterized in that the two cells with optical spatial index modulation are placed substantially in the same plane, and in that the router further includes an element provided in order to reflect the beams between the two cells.

9. The router as claimed in claim 8, characterized in that both cells comprises of the same optical component.

10. The router as claimed in claim 1 characterized in that the or one of said convergent optical assembly or assemblies comprises of a convergent lens overlapping a cell and having its focus in the vicinity of the opposite cell.

11. The router as claimed in claim 1 characterized in that the or one of said convergent optical assembly or assemblies comprises of two convergent lenses both placed on the path of the same optical beams, the focus of the assembly formed by these two lenses being located in the vicinity of said other cell.

12. The router as claimed in claim 1 characterized in that the or each said convergent optical assembly or assemblies is placed in front of a reflection cell the (each) convergent optical assembly being provided in order to be passed through twice by the same light beam.

13. The router as claimed in claim 1, characterized in that it comprises means for splitting each beam coming from an input channel and a first and a second sub-beam each having a different polarization, and means for reorienting, on each occasion, said first of sub-beams separated in this way into a chosen polarization, and in that it has at least one cell having two different portions, one intended to deflect said first sub-beams and the other intended to deflect said second subbeams.

14. The router as claimed in claim 13 the preceding claim, characterized in that the two portions intended to deflect the first and the second sub-beams, respectively, form a series of rows, the rows of the first portion alternating with the rows of the second portion.

15. The router as claimed in claim 13, characterized in that the two said parts intended to deflect the first and the second sub-beams, respectively, form two noninterlaced complete surfaces.

16. The router as claimed in claim 1 characterized in that one of the spatial index modulation cells is placed obliquely with respect to the mid-path of the light beams.

17. The router as claimed in claim 1 characterized in that at least one of the deflecting cells with spatial index modulation is a liquid crystal cell.

18. The router as claimed in claim 17, characterized in that said at least one deflecting cell is equipped with an addressing circuit of the type integrated on silicon, and is itself integrated on this circuit.

* * * * *

UNITED STATES PATENT AND TRADEMARK OFFICE
CERTIFICATE OF CORRECTION

PATENT NO.      : 6,714,339 B2
DATED           : March 30, 2004
INVENTOR(S)     : Gosselin et al.

It is certified that error appears in the above-identified patent and that said Letters Patent is hereby corrected as shown below:

<u>Title page,</u>
Item [75], Inventors, please delete "Pleumer Bodou" and insert -- Trébeurden --.

Signed and Sealed this

Twenty-third Day of November, 2004

JON W. DUDAS
*Director of the United States Patent and Trademark Office*